(12) United States Patent
Sampsell

(10) Patent No.: US 8,714,023 B2
(45) Date of Patent: May 6, 2014

(54) SYSTEM AND METHOD FOR DETECTING SURFACE PERTURBATIONS

(75) Inventor: Jeffrey B. Sampsell, Pueblo West, CO (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 469 days.

(21) Appl. No.: 13/045,173

(22) Filed: Mar. 10, 2011

(65) Prior Publication Data

US 2012/0229121 A1  Sep. 13, 2012

(51) Int. Cl.
*G01B 7/16*   (2006.01)

(52) U.S. Cl.
USPC .......................................................... 73/777

(58) Field of Classification Search
USPC ................................................. 73/760, 777
See application file for complete search history.

(56) References Cited

U.S. PATENT DOCUMENTS

| | | | |
|---|---|---|---|
| 3,919,669 A * | 11/1975 | Hartemann | 333/154 |
| 4,379,633 A * | 4/1983 | Bickel et al. | 356/502 |
| 4,441,791 A | 4/1984 | Hornbeck | |
| 4,571,603 A | 2/1986 | Hornbeck et al. | |
| 4,748,366 A | 5/1988 | Taylor | |
| 4,859,060 A | 8/1989 | Katagiri et al. | |
| 4,948,253 A | 8/1990 | Biegen | |
| 4,954,789 A | 9/1990 | Sampsell | |
| 5,058,611 A * | 10/1991 | Liers et al. | 134/105 |
| 5,083,857 A | 1/1992 | Hornbeck | |
| 5,204,734 A | 4/1993 | Cohen et al. | |
| 5,216,537 A | 6/1993 | Hornbeck | |
| 5,226,099 A | 7/1993 | Mignardi et al. | |
| 5,246,013 A * | 9/1993 | Frank et al. | 600/587 |
| 5,489,952 A | 2/1996 | Gove et al. | |
| 5,526,172 A | 6/1996 | Kanack | |
| 5,530,240 A | 6/1996 | Larson et al. | |
| 5,550,373 A | 8/1996 | Cole et al. | |
| 5,551,293 A | 9/1996 | Boysel et al. | |
| 5,565,987 A | 10/1996 | Jain et al. | |
| 5,629,521 A | 5/1997 | Lee et al. | |
| 5,779,651 A * | 7/1998 | Buschmann et al. | 600/587 |
| 5,815,141 A | 9/1998 | Phares | |
| 5,818,605 A | 10/1998 | Crewe et al. | |

(Continued)

FOREIGN PATENT DOCUMENTS

| | | |
|---|---|---|
| EP | 0 422 548 | 4/1991 |
| EP | 0 539 321 | 4/1993 |

(Continued)

OTHER PUBLICATIONS

ISR and WO dated May 22, 2012 in PCT/US12/028098.

(Continued)

*Primary Examiner* — Max Noori

(74) *Attorney, Agent, or Firm* — Knobbe, Martens, Olson & Bear, LLP

(57) ABSTRACT

This disclosure provides systems, methods and apparatus for assessing a surface using a piezoelectric element. In one aspect, the method includes applying a device to the surface, wherein the device includes at least one piezoelectric element and at least one EMS device, wherein the EMS device includes a conductive first layer separated from a conductive second layer, and wherein the piezoelectric element is electrically coupled to the EMS device such that a force applied to the piezoelectric element results in a voltage applied across the first and second layers.

14 Claims, 6 Drawing Sheets

(56) References Cited

U.S. PATENT DOCUMENTS

| | | |
|---|---|---|
| 5,835,642 A | 11/1998 | Gelikonov et al. |
| 5,894,686 A | 4/1999 | Parker et al. |
| 5,977,945 A | 11/1999 | Ohshima |
| 6,014,121 A | 1/2000 | Aratani et al. |
| 6,040,937 A | 3/2000 | Miles |
| 6,295,048 B1 | 9/2001 | Ward et al. |
| 6,304,297 B1 | 10/2001 | Swan |
| 6,307,194 B1 | 10/2001 | Fitzgibbons et al. |
| 6,666,561 B1 | 12/2003 | Blakley |
| 6,674,562 B1 | 1/2004 | Miles et al. |
| 6,737,979 B1 | 5/2004 | Smith et al. |
| 6,819,469 B1 | 11/2004 | Koba |
| 6,829,132 B2 | 12/2004 | Martin et al. |
| 7,123,216 B1 | 10/2006 | Miles |
| 7,138,984 B1 | 11/2006 | Miles |
| 7,149,028 B2* | 12/2006 | Yun ................................ 359/290 |
| 7,280,265 B2 | 10/2007 | Miles |
| 7,289,256 B2* | 10/2007 | Cummings et al. ........... 359/238 |
| 7,327,510 B2 | 2/2008 | Cummings et al. |
| 7,369,294 B2 | 5/2008 | Gally et al. |
| 7,460,246 B2 | 12/2008 | Kothari |
| 7,535,466 B2 | 5/2009 | Sampsell et al. |
| 7,586,484 B2 | 9/2009 | Sampsell et al. |
| 7,595,926 B2 | 9/2009 | Sasagawa et al. |
| 7,653,371 B2 | 1/2010 | Floyd |
| 7,657,242 B2 | 2/2010 | Floyd |
| 7,660,028 B2 | 2/2010 | Lan |
| 7,787,130 B2 | 8/2010 | Webster |
| 7,787,171 B2 | 8/2010 | Webster |
| 7,808,703 B2 | 10/2010 | Gally et al. |
| 7,852,483 B2 | 12/2010 | Kothari |
| 7,852,491 B2 | 12/2010 | Webster |
| 7,860,668 B2 | 12/2010 | Khazeni |
| 7,881,686 B2 | 2/2011 | Floyd |
| 7,903,047 B2 | 3/2011 | Cummings |
| 7,929,196 B2 | 4/2011 | Gally et al. |
| 7,936,031 B2* | 5/2011 | Sampsell et al. ............... 257/432 |
| 7,978,034 B2* | 7/2011 | Naito et al. ...................... 335/78 |
| 8,344,470 B2* | 1/2013 | Sampsell et al. ............... 257/432 |
| 2002/0075555 A1 | 6/2002 | Miles |
| 2003/0112507 A1 | 6/2003 | Divelbiss et al. |
| 2003/0117382 A1 | 6/2003 | Pawlowski et al. |
| 2003/0128197 A1 | 7/2003 | Turner et al. |
| 2003/0226955 A1 | 12/2003 | Kim et al. |
| 2004/0024580 A1 | 2/2004 | Salmonsen et al. |
| 2005/0001797 A1 | 1/2005 | Miller et al. |
| 2005/0068254 A1 | 3/2005 | Booth |
| 2006/0066596 A1 | 3/2006 | Sampsell et al. |
| 2006/0176241 A1 | 8/2006 | Sampsell |
| 2006/0207317 A1 | 9/2006 | Watanabe |
| 2007/0023851 A1 | 2/2007 | Hartzell et al. |
| 2007/0200839 A1 | 8/2007 | Sampsell |
| 2007/0247406 A1 | 10/2007 | Zhou et al. |
| 2008/0112031 A1 | 5/2008 | Gally et al. |
| 2008/0209988 A1 | 9/2008 | Degertekin |
| 2009/0207473 A1 | 8/2009 | Bita et al. |
| 2009/0244679 A1 | 10/2009 | Khazeni et al. |
| 2009/0267869 A1 | 10/2009 | Gally et al. |
| 2009/0267953 A1 | 10/2009 | Sampsell et al. |
| 2009/0308452 A1 | 12/2009 | Sasagawa et al. |
| 2010/0117761 A1 | 5/2010 | Floyd |
| 2010/0123706 A1 | 5/2010 | Lan |
| 2010/0220248 A1 | 9/2010 | Miles |
| 2011/0071775 A1 | 3/2011 | Khazeni |
| 2011/0085278 A1 | 4/2011 | Floyd |
| 2011/0115762 A1* | 5/2011 | Sasagawa et al. ............. 345/204 |

FOREIGN PATENT DOCUMENTS

| | | |
|---|---|---|
| EP | 0 649 010 | 4/1995 |
| EP | 0 702 205 A2 | 3/1996 |
| EP | 0 725 380 | 8/1996 |
| EP | 1 890 105 A1 | 2/2008 |
| EP | 2 017 599 | 1/2009 |
| JP | 2005-039995 | 2/2005 |
| WO | WO 2004/066256 | 8/2004 |
| WO | WO 2005/054148 | 6/2005 |
| WO | WO 2005/066596 | 7/2005 |

OTHER PUBLICATIONS

Brank et al., Sep. 2001, RF MEMS-based tunable filters, International Journal of RF and Microwave Computer-Aided Engineering, 11(5):276-284.

Miles, A New Reflective FPD Technology Using Interferometric Modulation, Journal of the SID 5/4, 1997, pp. 379-382.

Miles, "MEMS-based interferometric modulator for display applications," Proceedings of SPIE, vol. 3876, Aug. 1999, pp. 20-281.

Miles et al., 10.1: Digital Paper™ for reflective displays, SID 02 Digest, pp. 115-117, 2002.

Winton, John M., A novel way to capture solar energy, Chemical Week, pp. 17-18 (May 15, 1985).

Wu, Design of a Reflective Color LCD Using Optical Interference Reflectors, ASIA Display '95, pp. 929-931 (Oct. 16, 1995).

* cited by examiner

SYSTEM AND METHOD FOR DETECTING SURFACE PERTURBATIONS

TECHNICAL FIELD

This disclosure relates to sensors configured to detect surface perturbations.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a metallic membrane separated from the stationary layer by an air gap. The position of one plate in relation to another can change the optical interference of light incident on the interferometric modulator. Interferometric modulator devices have a wide range of applications, and are anticipated to be used in improving existing products and creating new products.

In many manufacturing and quality control processes, it can be desirable to assess the flatness and/or uniformity of a surface. Traditionally, such assessment was performed either by sight or touch of a craftsman or using expensive ultrasonic, optical, or capacitive sensors that use a processor to provide an analysis of the surface under examination. It would be desirable to have a reliable and reproducible method of detecting surface perturbations without the need for expensive equipment

SUMMARY

The systems, methods and devices of the disclosure each have several innovative aspects, no single one of which is solely responsible for the desirable attributes disclosed herein.

One innovative aspect of the subject matter described in this disclosure can be implemented in a device for assessing a surface. In some implementations, the device includes at least one piezoelectric element and at least one electromechanical system (EMS) device. The EMS device may include a conductive first layer separated from a conductive second layer. The piezoelectric element may be electrically coupled to the EMS device such that a force applied to the piezoelectric element results in an introduction of charge to both the first and second layers.

In some implementations, the at least one piezoelectric element includes a two-dimensional array of piezoelectric elements, the at least one EMS device comprises a two-dimensional array of EMS devices, and each of the piezoelectric elements is electrically coupled to an EMS device at a corresponding location.

In some implementations, the at least one EMS device comprises at least one interferometric modulator. In some implementations, the first layer is at least partially reflective and at least partially transmissive and wherein the second layer is at least partially reflective.

In some implementations, a method of assessing a surface comprises applying a device to the surface, the device comprising at least one piezoelectric element and at least one EMS device including a conductive first layer separated from a conductive second layer, wherein the piezoelectric element is electrically coupled to the EMS device such that a force applied to the piezoelectric element results in an introduction of charge to both the first and second layers.

In some implementations, the method further includes viewing the at least one EMS device and determining the presence of a perturbation on the surface based on the viewing. The viewing may be performed by an image capturing device and the determining may be performed by a processor.

In some implementations, determining the presence of a perturbation comprises determining that at least one EMS device at a specific location has changed appearance and determining the presence of a perturbation at a corresponding location of the specific location. In some implementations, the method further includes removing the perturbation from the surface. In some implementations, removing the perturbation comprises machining, sanding, or laser-removing the perturbation.

In some implementations, a device for assessing a surface comprises means for generating a voltage in response to an applied force and means for changing reflective properties in response to an applied voltage. The means for generating may be electrically coupled to the means for changing such that a force applied to the means for generating results in a voltage applied across means for changing.

In some implementations, the means for generating comprises at least one piezoelectric element. In some implementations, the means for changing comprises at least one EMS device.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The following detailed description is directed to certain implementations for the purposes of describing the innovative aspects. However, the teachings herein can be applied in a multitude of different ways. Thus, the teachings are not intended to be limited to the implementations depicted solely in the Figures, but instead have wide applicability as will be readily apparent to one having ordinary skill in the art.

One implementation described herein includes a sensor with at least one piezoelectric element coupled to at least one EMS device. When pressure is applied to the piezoelectric element, a voltage is generated and applied to opposing surfaces of the EMS device, thereby drawing the opposing surfaces together. Pressure can be applied to the piezoelectric element when the sensor is pressed against a surface. Perturbations or asperities in the surface can result in additional pressure that can result in additional voltage generated by the piezoelectric element. The additional voltage, in turn, can result in additional displacement of the surfaces of the EMS device.

Particular implementations of the subject matter described in this disclosure can be implemented to realize one or more of the following potential advantages. In some implementations, such a sensor can be incorporated into a device that transforms, without a battery or external power source, surface perturbations into a false color image that can be viewed by a user to determine locations and magnitudes of such perturbations. Thus, the device can be used to reliably and reproducibly detect surface perturbations without the need for expensive equipment such as a processor or a power source. Of course, in other implementations, the device may include these features, including, for example, a processor or a power source.

One example of a suitable EMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

Figure 1A:
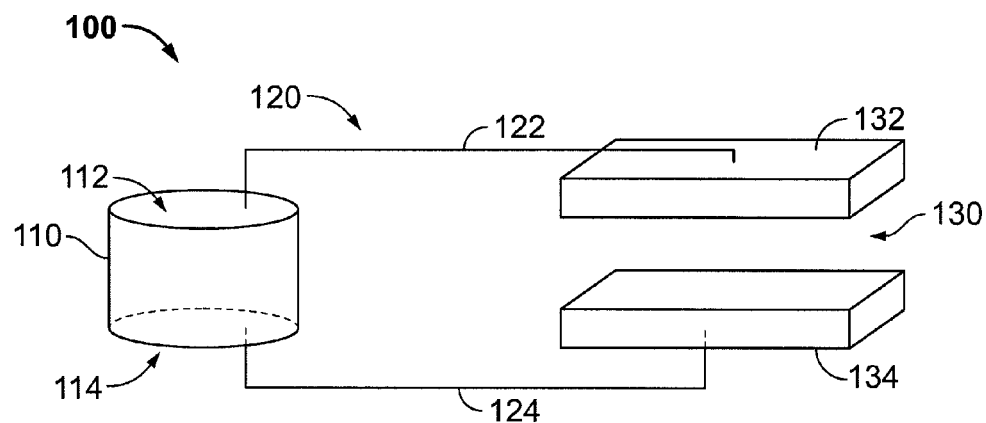
FIGS. 1A and 1B are example block diagrams of a system including a piezoelectric element coupled to an EMS device.
Figure 1B:
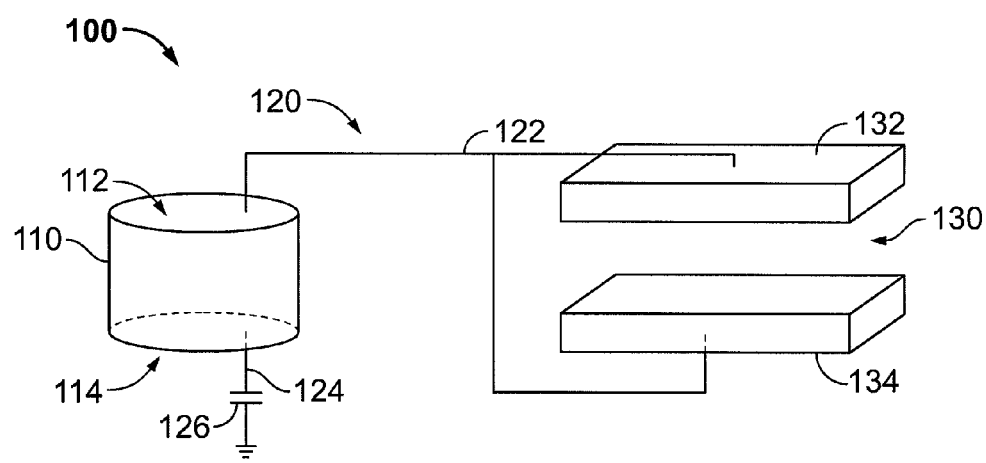

FIGS. 1A and 1B are example block diagrams of a system including a piezoelectric element 110 coupled to an EMS device 130.

The piezoelectric element 110 generates a voltage across two points of the piezoelectric element 110 when a force F, such as a pressure, is applied to the piezoelectric element 110. The piezoelectric element 110 can be a naturally occurring or man-made material. For example, the piezoelectric element 110 can be quartz, wood, gallium orthophosphate ($GaPO_4$), langasite ($La_3Ga_5SiO_{14}$), barium titanate ($BaTiO_3$), lead titanate ($PbTiO_3$), potassium niobate ($KNbO_3$), lithium niobate ($LiNbO_3$), lithium tantalate ($LiTaO_3$), sodium tungstate ($Na_2WO_3$), sodium potassium niobate (NaKNb), bismuth ferrite ($BiFeO_3$), sodium niobate $NaNbO_3$, or polyvinylidene fluoride (PVDF). In some implementations, the piezoelectric element 110 is lead zirconate titanate ($Pb[Zr_xTi_{1-x}]O_3$, $0<x<1$), also known as PZT.

Depending on how the piezoelectric element 110 is prepared, three main modes of operation can be distinguished: transverse, longitudinal, and shear. In transverse operation, a force applied along a first axis can generate a voltage across a second axis perpendicular to the first axis. The amount of voltage generated can be generally proportional to the applied force and also can depend on the geometric dimensions of the piezoelectric element 110.

In longitudinal operation, a force applied along a first axis can generate a voltage across the same axis. The amount of voltage generated can be generally proportional to the applied force and may not strongly depend on the geometric dimensions of the piezoelectric element 110. Thus, in some implementations, the piezoelectric element 110 can include many piezoelectric elements 110 mechanically in series and electrically in parallel to increase the resulting voltage.

In shear operation, as in longitudinal operation, a force applied along a first axis can generate a voltage across the same axis that can be generally proportional to the applied force and may not strongly depend on the geometric dimensions of the piezoelectric element 110.

As described above, in response to a force applied to the piezoelectric element 110, a voltage can be generated across the piezoelectric element 110. The piezoelectric element 110 can be coupled via one or more conductors 120 to a EMS device 130. Thus, a generated voltage can be applied to the EMS device 130.

In some implementations, as illustrated in FIG. 1A, a first surface 112 of the piezoelectric element 110 can be coupled via a first conductor 122 to a first layer 132 of the EMS device 130 and a second surface 114 can be coupled via a second conductor 124 to a second layer 134 of the EMS device 130. In some other implementations, as illustrated in FIG. 1B, a first surface 112 of the piezoelectric element 110 can be coupled via a first conductor 122 to both a first layer 132 and a second layer 134 of the EMS device 130 and a second surface 114 can be coupled via a second conductor 124 to a separate capacitive element 126.

When a force is applied to a piezoelectric element, the element creates a field that moves positive charges in one direction and negative charges in another. In the implementation of FIG. 1A, a first conductor 122 connects to a location where positive charges are transported and a second conductor 124 connects to a location where negative charges are transported. Thus, the first layer 132 and second layer 134 of the EMS device 130 are pulled towards one another as the opposite charges attract. However, in the implementation of FIG. 1B, The first conductor 132 couples the first layer 132 and the second layer 134 of the EMS device to the same surface 112 of the piezoelectric element 110. Thus, both the first layer 132 and second layer 134 acquire either negative or positive charges. Thus, the first layer 132 and second layer 134 are pushed apart from one another as the similar charges repel.

When positive or negative charge is introduced to the first layer 132 and charge of an opposite polarity is introduced to the second layer 134 of the EMS device 130, the first layer 132 and second layer 134 can be attracted to one another. When positive or negative charge is introduced to the first layer 132 and charge of the same polarity is introduced to the second layer 134 of the EMS device 130, the first layer 132 and second layer 134 can be repelled from one another In some implementations, the EMS device 130 can be an interferometric modulator. Thus, the first layer 132 can be conductive, at least partially reflective, and at least partially transmissive and the second layer 134 can be conductive and at least partially reflective. Thus, the cavity between the two surfaces can function as an interferometric cavity. In some implementations, the EMS device 130 can inferometrically modulate at least one visible wavelength of light. In some implementations, the gap distance between the first layer 132 and second layer can be less than 5 µm, less than 4 µm, less than 3 µm, less than 2 µm, or less than 1 µm. The reflective properties of the EMS device 130 can depend, at least in part, on the gap distance between the first layer 132 and the second layer 134. In some implementations, the EMS device 130 can reflect different wavelengths of light depending on the gap distance. Thus, the EMS device 130 can appear as a different color depending on the gap distance, which is a function of the voltage applied which is, in turn, a function of the force applied to the piezoelectric element 110.

In other implementations, the EMS device can be a cantilevered device in which a first surface can bend towards a second surface when a voltage is applied across the surfaces. In other implementations, the EMS device can be a liquid crystal element that can change its absorptive properties when a voltage is applied across the surfaces. In some implementations, the EMS device can be a spatial light modulator. In some implementations, the EMS device can be a holographic spatial light modulator. Each of these EMS devices can change its reflective properties in response to an applied voltage.

The gap distance of the EMS device can be a static distance when no voltage is applied the device. However, as mentioned above, when a force is applied to the piezoelectric element 110, the gap distance and reflective properties of the EMS device 130 can change. Thus, the gap distance of the EMS device can be a deflected distance whose amount of deflection is based on the force applied to the piezoelectric element 110. When the force is removed, the piezoelectric element 110 may no longer generate a voltage and, therefore, a voltage may not be applied to the EMS device 130. In some implementations, because of hysteresis in the materials of the EMS device 130, the EMS device 130 can automatically return to the static distance.

Although the piezoelectric element 110 can be modeled as a voltage source when a force is applied, the piezoelectric element 110 may be dissimilar to a battery in that the piezoelectric element may not continuously generate a current. Particularly, in response to an amount of applied force, the piezoelectric element 110 can generate a proportional amount of charge. If this charge is removed by, for example, completing a circuit between the two sides of the piezoelectric element 110 or by coupling both sides of the piezoelectric element 110 to a ground potential, the piezoelectric element 110 may be rendered inert. Once the circuit is broken and the force removed, an opposite charge can be generated. This charge can also be removed by completing a circuit between the two sides or by coupling both sides to a ground potential. However, in the implementation illustrated in FIG. 1, no circuit is formed and a maintained force can generate a maintained voltage applied across the first layer 132 and second layer 134 of the EMS device 130.

Figure 2:
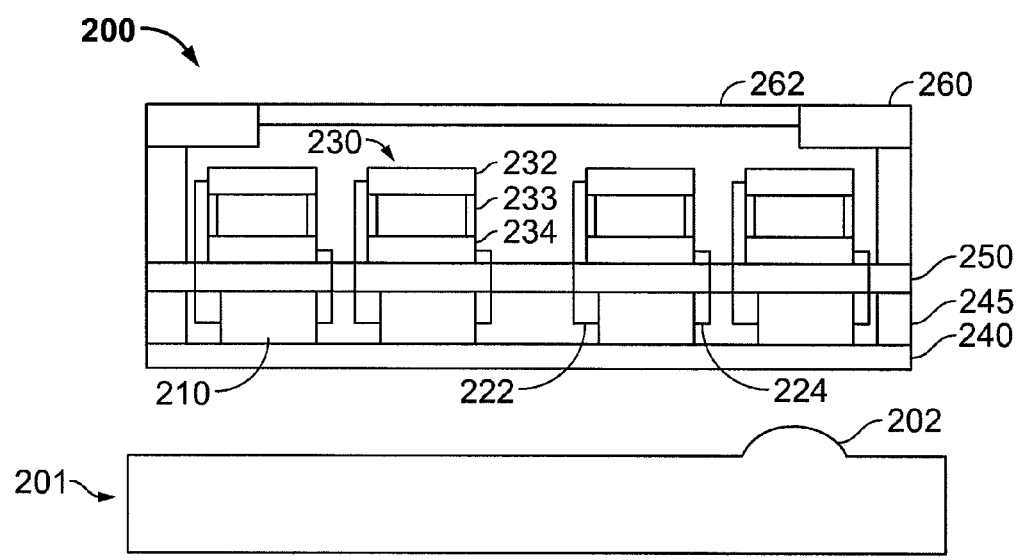
FIG. 2 is an example cross-sectional view of a device for detecting perturbations in a surface.

The system 100 and principles described above with respect to FIG. 1 can be used in a device for detecting perturbations in a surface. FIG. 2 is an example cross-sectional view of a device for detecting perturbations in a surface. The device 200 can include an array of piezoelectric elements 210, each electrically coupled to at least one interferometric modulator 230. The coupling of the piezoelectric elements 210 to the interferometric modulators 230 can be one-to-one, many-to-one, or one-to-many. In some implementations, the device can include a two-dimensional array of piezoelectric elements 210 and a two-dimensional array of interferometric modulators 230 and each piezoelectric element 210 can be coupled to an interferometric modulator 230 at a corresponding location.

In some implementations, such as the implementation illustrated in FIG. 2, each piezoelectric element 210 can be coupled to an interferometric modulator 230 by two conductors 222, 224. In particular, a first side of the piezoelectric element 210 can be coupled by a first conductor 222 to a first layer 232 of the interferometric modulator 230 and a second side of the piezoelectric element 210 can be coupled by a second conductor 224 to a second layer 234 of the interferometric modulator 230. The first layer 232 of the interferometric modulator 230 can be conductive, at least partially reflective, and at least partially transmissive. The second layer 234 of the interferometric modulator 230 can be conductive and at least partially reflective. The first layer 232 and second layer 234 can be separated by support posts 233.

The array of piezoelectric elements 210 can be supported and protected by a flexible membrane 240 that can be applied to the surface 201 to be tested. The flexible membrane 240 can be made of an elastomer or other suitable material. An elastomer can be an elastic polymer, such as rubber. The array of piezoelectric elements 210 can be sandwiched between the flexible membrane 240 and a substrate 250. The piezoelectric elements 210 can be directly attached to the flexible membrane 240 or can be formed on or attached to the substrate 250. Similarly, the interferometric modulators can be formed on the substrate 250. The substrate 250 can be formed of glass, plastic, metal, ceramic, or any suitable material.

The degree of flexibility of the flexible membrane 240 can be made commensurate with a range of surface irregularity to be measured. An artisan or user might use multiple such devices 200 as a series of inspection tools of various sensitivity, just as the surface to be measured might have been created through the use of a series of progressively less coarse sand papers.

In some implementations, the device 200 can also include a housing 260 that protects the interferometric modulators. The housing 260 can be formed of glass, plastic, metal, ceramic, or any suitable material. In some implementations, the housing 260 can include a transparent window 262 through which the interferometric modulators 230 can be viewed by a user of the device 200. In some implementations, the housing 260 can include a portion 245 between the flexible membrane 240 and the substrate 250. In some implementations, the portion 245 can be elastic, allowing for pressure from a uniformly flat surface to be applied to all the piezoelectric elements 210 simultaneously. In other implementations, the portion 245 can be rigid such that only perturbations 202 in the surface 201 result in pressure applied to the piezoelectric elements 210.

When the device 200 is pressed against the surface 201, pressure from the surface can push against the flexible membrane 240. The piezoelectric elements 230 can be squeezed between the flexible membrane 240 and the substrate 250, thereby deforming the piezoelectric elements 210 and generating a voltage that can be applied to the interferometric modulator 230 via the conductors. The first layer 232 of each interferometric modulator 230 can be displaced with respect to the second layer 234 according to the amount of voltage applied via the conductors. In some implementations, the second layer 234 is rigidly attached to the substrate 250 and, therefore, may not be displaced. When the first layer 232 is displaced relative to the second layer 234, the reflective properties and apparent color of the interferometric modulator 230 can change, revealing to a user the amount of force applied to the corresponding piezoelectric element 210.

In some implementations, perfect surface flatness can be displayed as magenta, and increasing deviations from flatness can cause the interferometric modulator 230 to display red, orange, yellow, green, cyan and blue. In other implementations, the colors are reversed.

Figure 3A:
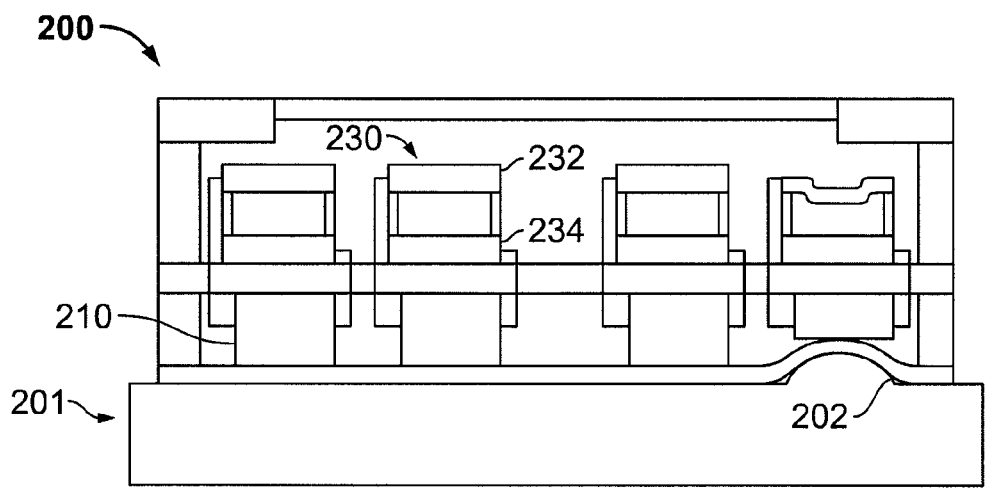
FIG. 3A is an example cross-sectional view of the device of FIG. 2 applied to a surface.

FIG. 3A is an example cross-sectional view of the device of FIG. 2 applied to a surface. When the device 200 is pressed against the surface 201, the perturbation 202 can press against the rightmost piezoelectric element 210. The piezoelectric element 210 can deform and generate a voltage. The voltage can be applied to the interferometric modulator 230 in the corresponding location, resulting in the first layer 232 of the interferometric modulator moving closer the second layer 234. Thus, the reflective properties and the apparent color of the interferometric modulator 230 can change and, in particular, differ from the apparent color of the other interferometric modulators 230. Thus, a user of the device 200 can detect and locate the perturbation 202.

Figure 3B:
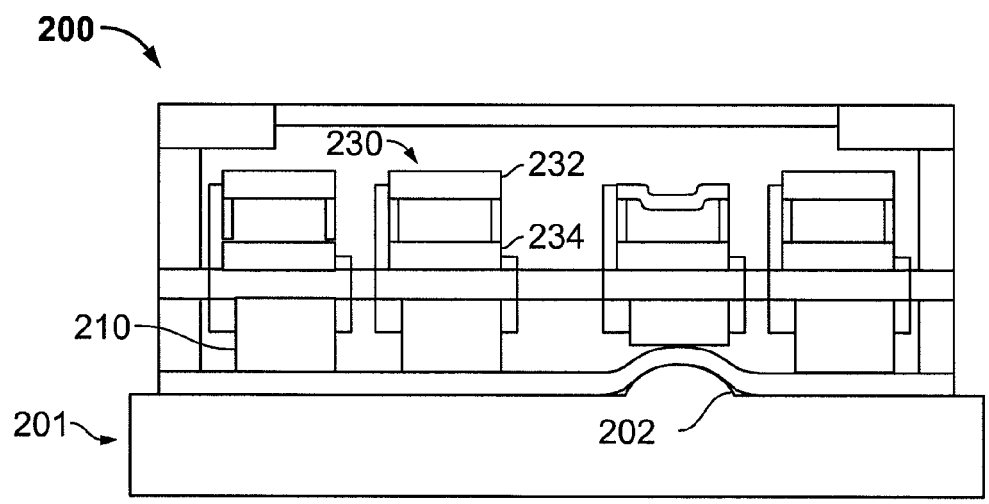
FIG. 3B illustrates the cross-sectional view of FIG. 3A with the device in another position.

FIG. 3B illustrates the cross-sectional view of FIG. 3A with the device in another position. If the device 200 is moved along the surface 201, the relative position of the perturbation 202 with respect to the device 200 can change. Thus, the perturbation 202 can apply a force to a different piezoelectric element 210 resulting in a change of color of a different interferometric modulator 230. Thus, a user of the device 200 can detect and locate the perturbation 202 by moving the device along the surface 201.

In some implementations, the device 200 also can include an image capture device to image the interferometric modulators 230. In some implementations, such imaging can include measuring the capacitance of each interferometric modulator 230 and saving this information into a memory.

As described above with respect to FIG. 1, if two surfaces of a piezoelectric element 210 are electrically coupled, or if both surfaces are coupled to ground, a current can flow removing charge accumulated by the piezoelectric element. In some implementations, the device 200 can include shunts that can, based on input from a user, selectively discharge the accumulated charge of the piezoelectric elements 210 by either electrically coupling both surfaces together or by electrically coupling both surfaces to a ground potential. Thus, if a user of the device 200 activates the shunts, the device can be zeroed to a particular pressure profile. This can be useful to reset the device before assessing a surface.

Figure 4:
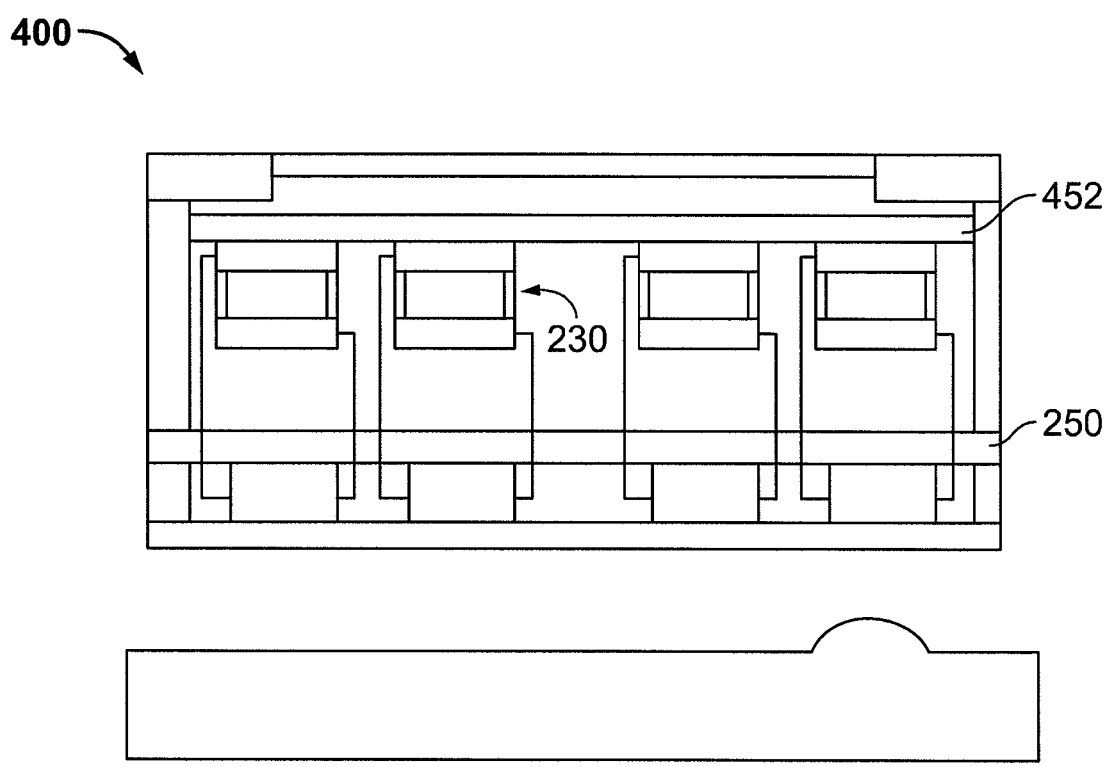
FIG. 4 is another example cross-sectional view of a device for detecting perturbations in a surface.

FIG. 4 is another example cross-sectional view of a device for detecting perturbations in a surface. The device 400 of FIG. 4 can be the same as the device 200 of FIG. 2 except for the relative position of the interferometric modulators 230 with respect to the substrate 250. Whereas, in some implementations, such as the device 200 illustrated in FIG. 2, the interferometric modulators 230 can be attached to substrate 250 against which the piezoelectric elements 210 can be pressed, in other implementations, such as the device 400 illustrated in FIG. 4, the interferometric modulators can be attached to a second substrate 452 that is not between the interferometric modulators and the piezoelectric elements. In some implementations, the second substrate 452 can also perform the function of the window, thereby reducing the number of parts and simplifying construction of the tool.

Figure 5:
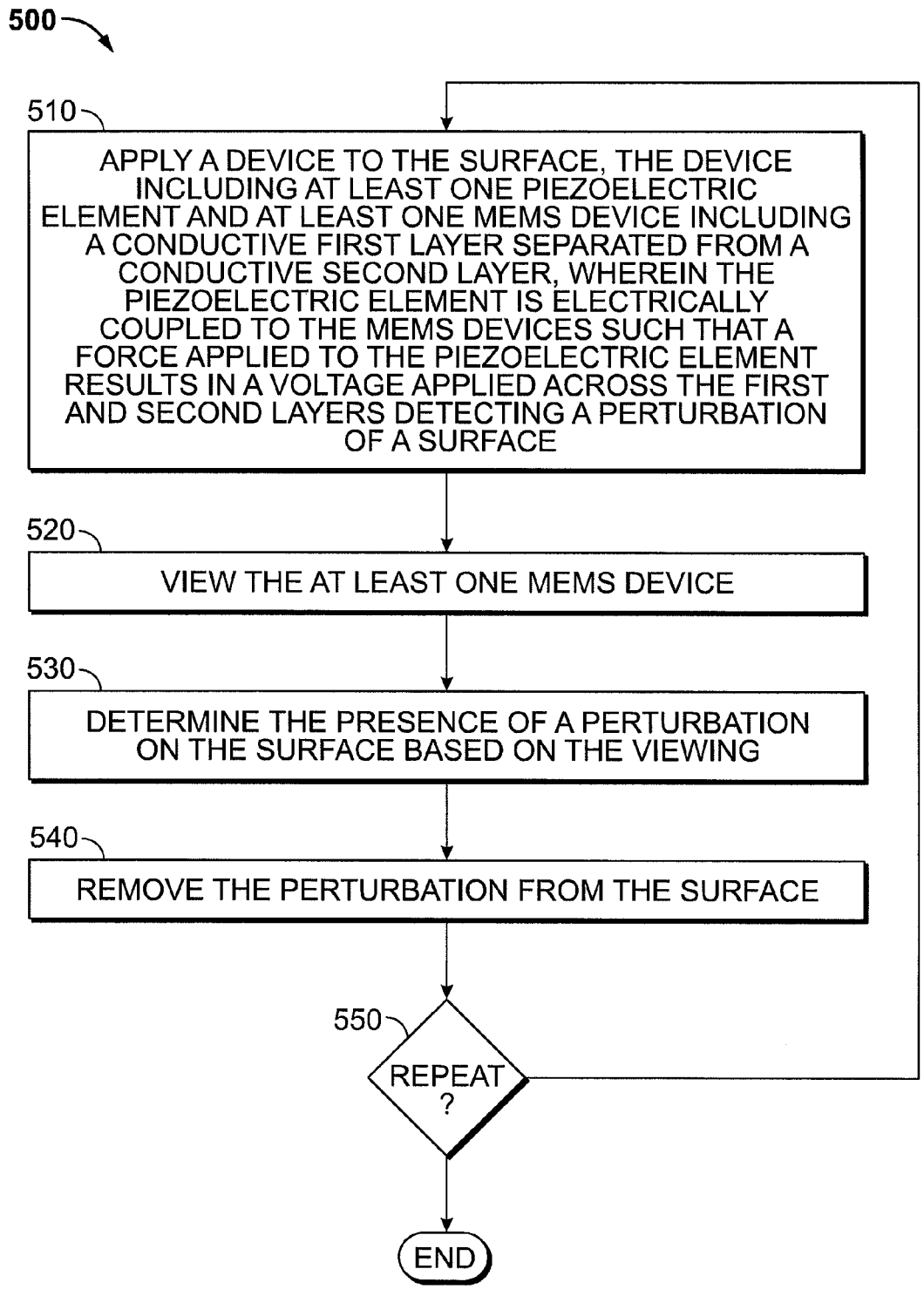
FIG. 5 is an example flowchart illustrating a method of assessing a surface.

FIG. 5 is an example flowchart illustrating a method of assessing a surface. The method 500 can begin in block 510 by applying a device to the surface such as the device 200 of FIG. 2. In particular, the device can include at least one piezoelectric element and at least one EMS device including a conductive first layer separated from a conductive second layer. In some implementations, the piezoelectric element can be electrically coupled to the EMS device such that a force applied to the piezoelectric element results in a voltage applied across the first and second layers. Thus, a perturbation of a surface can be detected. In some implementations, the device can be applied by a user, such as a craftsman, a manufacturer, or a quality control inspector. In other implementations, the device can be applied automatically by a testing machine. In some implementations, applying the device to the surface can include moving the device along the surface.

In some implementations, the at least one piezoelectric element can include a two-dimensional array of piezoelectric elements. Likewise, in some implementations, the at least one EMS device can include a two-dimensional array of EMS devices. In some implementations, each of the piezoelectric elements can be electrically coupled to a EMS device at a corresponding location. The at least one EMS device can include, for example, an interferometric modulator or a two-dimensional array of interferometric modulators. In particular, in some implementations, the first layer can be at least partially reflective and at least partially transmissive and the second layer can be at least partially reflective.

In some implementations, the device can include a flexible membrane and a substrate and the at least one piezoelectric element can be sandwiched between the flexible membrane and the substrate. Thus, applying the device to the surface can include applying a flexible membrane of the device to the substrate. In some implementations, the device can include a housing. Thus, applying the device to the surface can include holding the device by the housing and moving the device along the surface.

The method 500 can continue to block 520 by viewing the at least one EMS device. In some implementations, the housing can include a transparent window through which a user can view the at least one EMS device. In some implementations, the viewing can be performed by a user. In other implementations, the viewing can be performed by a testing machine including a camera or other image capturing device.

The method 500 can continue to block 530 by determining the presence of a perturbation on the surface based on the viewing. Determining the presence can include, for example, determining that at least one MEMS device at a specific location has changed appearance and determining the presence of a perturbation at a corresponding location of the specific location. In some implementations, the determining can be performed by a user. In other implementations, the determining can be performed by a testing machine including a processor which determines the presence of a perturbation based on a captured image of the at least one EMS device. In some implementations, the changed appearance may be a changed color of the at least one MEMS device. In some other implementations, the changed appearance may be a change in brightness of the at least one MEMS device.

The method 500 can continue to block 540 by removing the perturbation from the surface. The perturbation can be removed by machining the perturbation, sanding the perturbation, laser-removing the perturbation, etc. In some implementations, the perturbation can be removed by a user, such as a craftsman or a quality control inspector. In other implementations, the perturbation can be removed automatically by a testing or finishing machine.

Once a perturbation is removed, the method 500 can end or repeat (in block 540) to further assess the surface and remove other perturbations.

Figure 6:
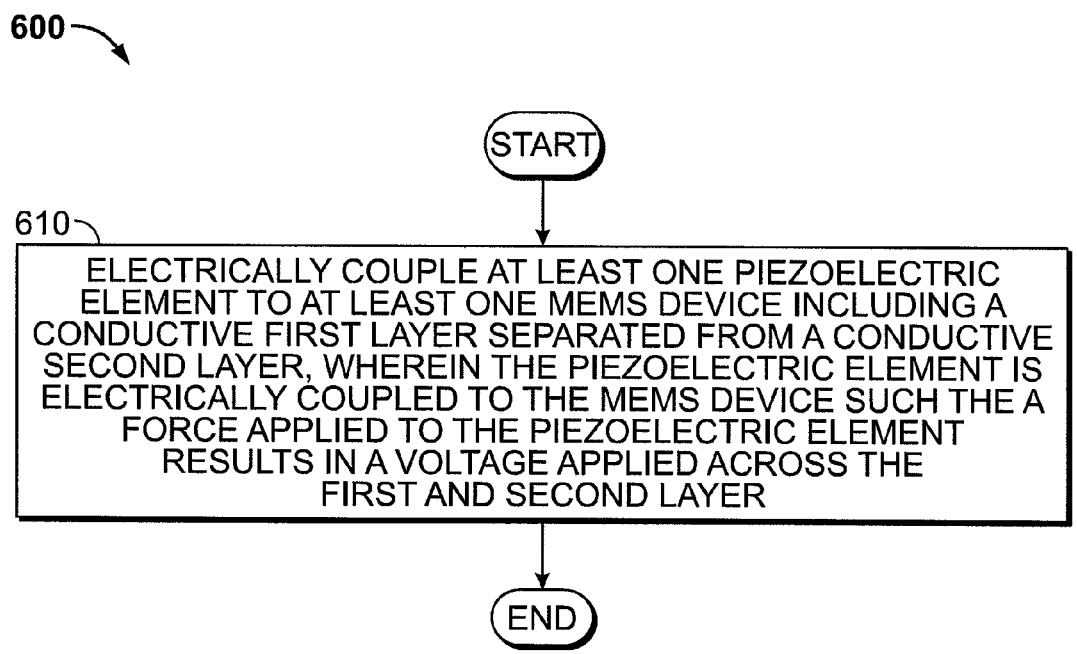
FIG. 6 is an example flowchart illustrating a method of manufacturing a device for assessing a surface.

FIG. 6 is an example flowchart illustrating a method of manufacturing a device for assessing a surface. The method 600 can begin in block 610 by electrically coupling at least one piezoelectric element to at least one EMS device including a conductive first layer separated from a conductive second layer. The piezoelectric element can be electrically coupled to the EMS device such that a force applied to the piezoelectric element results in a voltage applied across the first and second layers. The electrical coupling can be performed, for example, by positioning the piezoelectric element next to the EMS device or by connecting conductors between the piezoelectric element and the EMS device.

In some implementations, the coupling can include electrically coupling a two-dimensional array of piezoelectric elements to a two-dimensional array of EMS devices such that each of the piezoelectric elements is electrically coupled to a EMS device at a corresponding location. In some implementations, the at least one EMS device can include at least one interferometric modulator or a two-dimensional array of interferometric modulators.

In some implementations, the method 600 can include sandwiching the at least one EMS device between a flexible membrane and a substrate. In some implementations, the flexible membrane can be made of an elastomer and the substrate can be made of glass, plastic, metal, or ceramic. In some implementations, the method 600 also can include forming the at least one EMS device on the substrate. The at least one EMS element can be formed as an interferometric modulator, a cantilevered device, a liquid crystal element, a spatial light modulator, or a holographic spatial light modulator. In some implementations, the method 600 can include forming the at least one EMS device on a second substrate.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A device for assessing a surface, the device comprising:
    at least one piezoelectric element; and
    at least one reflective display electromechanical system (EMS) device including a conductive first layer separated from a conductive second layer,
    wherein the piezoelectric element is electrically coupled to the reflective display EMS device such that a force applied to the piezoelectric element results in an introduction of charge to both the first and second layers, further comprising a separate capacitive element, wherein a first surface of the piezoelectric element is electrically coupled to both the first layer and the second layer and a second surface of the piezoelectric element is electrically coupled to the separate capacitive element.

2. A device for assessing a surface, the device comprising:
    at least one piezoelectric element; and
    at least one reflective display electromechanical system (EMS) device including a conductive first layer separated from a conductive second layer,
    wherein the piezoelectric element is electrically coupled to the reflective display EMS device such that a force applied to the piezoelectric element results in an introduction of charge to both the first and second layers, further comprising a flexible membrane and a substrate, wherein the at least one piezoelectric element is sandwiched between the flexible membrane and the substrate, further comprising a housing, wherein the housing comprises a transparent window through which a user can view the at least one reflective display EMS device.

3. The device of claim 2, wherein the housing comprises a rigid portion between the flexible membrane and the substrate.

4. The device of claim 2, wherein the housing comprises a flexible portion between the flexible membrane and the substrate.

5. A device for assessing a surface, the device comprising:
    at least one piezoelectric element; and
    at least one reflective display electromechanical system (EMS) device including a conductive first layer separated from a conductive second layer,
    wherein the piezoelectric element is electrically coupled to the reflective display EMS device such that a force applied to the piezoelectric element results in an introduction of charge to both the first and second layers, further comprising one or more shunts configured to discharge accumulated charge from the piezoelectric element, further comprising a user input device which, when used by a user, causes the shunts to discharge the accumulated charge.

6. A method of assessing a surface, the method comprising:
    applying a device to the surface, the device comprising at least one piezoelectric element and at least one reflective display EMS device including a conductive first layer separated from a conductive second layer, wherein the piezoelectric element is electrically coupled to the reflective display EMS device such that a force applied to the piezoelectric element results in an introduction of charge to both the first and second layers, further comprising:
    viewing the at least one reflective display EMS device; and
    determining the presence of a perturbation on the surface based on the viewing.

7. The method of claim 6, wherein viewing the at least one reflective display EMS device is performed by an image capturing device and wherein determining the presence of a perturbation on the surface is performed by a processor.

8. The method of claim 6, wherein determining the presence of a perturbation comprises:
    determining that at least one reflective display EMS device at a specific location has changed appearance; and
    determining the presence of a perturbation at a corresponding location of the specific location.

9. The method of claim 6, further comprising removing the perturbation from the surface.

10. The method of claim 9, further comprising repeating the method for a plurality of perturbations.

11. The method of claim 9, wherein removing the perturbation comprises machining, sanding, or laser-removing the perturbation.

12. A method of assessing a surface, the method comprising:
    applying a device to the surface, the device comprising at least one piezoelectric element and at least one reflective display EMS device including a conductive first layer separated from a conductive second layer, wherein the piezoelectric element is electrically coupled to the reflective display EMS device such that a force applied to the piezoelectric element results in an introduction of charge to both the first and second layers, wherein the device comprises a flexible membrane and applying the device to the surface comprises applying the flexible membrane to the surface.

13. A method of assessing a surface, the method comprising:
    applying a device to the surface, the device comprising at least one piezoelectric element and at least one reflective display EMS device including a conductive first layer separated from a conductive second layer, wherein the piezoelectric element is electrically coupled to the reflective display EMS device such that a force applied to the piezoelectric element results in an introduction of charge to both the first and second layers, further comprising
    applying a second device to the surface, the second device comprising at least one piezoelectric element and at least one reflective display EMS device including a conductive first layer separated from a conductive second layer, wherein the piezoelectric element is electrically coupled to the reflective display EMS device such that a force applied to the piezoelectric element results in a voltage applied across the first and second layers, wherein the second device comprises a second flexible membrane and applying the second device to the surface comprises applying the second flexible membrane to the surface, and wherein the flexible membrane and the second flexible membrane have different degrees of flexibility.

14. A device for assessing a surface, the device comprising:

means for generating a voltage in response to an applied force; and means for changing reflective properties in response to an applied voltage, wherein the means for changing comprises at least one reflective display EMS device, wherein the means for generating is electrically coupled to the means for changing such that a force applied to the means for generating results in a voltage applied across means for changing, further comprising means for housing, wherein the means for housing comprises a transparent means through which a user can view the means for changing.

* * * * *